United States Patent
Fujita et al.

(10) Patent No.: US 6,177,150 B1
(45) Date of Patent: Jan. 23, 2001

(54) PHOTOMAGNETIC RECORDING MEDIUM AND FILM FORMING METHOD

(75) Inventors: Goro Fujita; Minehiro Tonosaki, both of Kanagawa (JP)

(73) Assignee: Sony Corporation, Tokyo (JP)

(*) Notice: Under 35 U.S.C. 154(b), the term of this patent shall be extended for 0 days.

(21) Appl. No.: 09/138,046

(22) Filed: Aug. 21, 1998

Related U.S. Application Data

(62) Division of application No. 08/871,378, filed on Jun. 9, 1997, now Pat. No. 6,110,610.

(30) Foreign Application Priority Data

Jun. 15, 1996 (JP) ................................................ 08-147432
Jul. 16, 1996 (JP) ................................................ 08-186007

(51) Int. Cl.$^7$ ....................................................... G11B 5/66
(52) U.S. Cl. .......................... 427/586; 427/128; 427/129; 427/130; 427/596; 427/599; 428/694 DE; 428/694 TP; 428/694 TC; 428/900
(58) Field of Search ................. 428/694, 694 DE, 428/694 TP, 694 TC, 900; 427/128–130, 586, 596, 599

(56) References Cited

U.S. PATENT DOCUMENTS 5,364,690 * 11/1994 Takahashi .
5,637,373 *  6/1997 Hayashi .
5,637,393 *  6/1997 Ueda .

* cited by examiner

Primary Examiner—Leszek Kiliman
(74) Attorney, Agent, or Firm—Sonnenschein, Nath & Rosenthal

(57) ABSTRACT

A magneto-optical disc in which, for preventing damage to a recording layer in case the foreign matter is sandwiched between a magnetic field modulation head and the magneto-optical disc, or the magnetic field modulation head is contacted for some reason with the magneto-optical disc, the direction of magnetization of the recording layer formed on a polycarbonate substrate, designed for transmitting the laser light, is switched by the magnetic field modulation head. The magnetic field modulation head is mounted floating in a direction opposite to the direction of incidence of the laser light from an optical head converged on an objective lens. A diamond-like carbon (DLC) protective film, composed of a thin DLC film, is provided on the surface of recording layer towards the magnetic field modulation head.

6 Claims, 6 Drawing Sheets

PHOTOMAGNETIC RECORDING MEDIUM AND FILM FORMING METHOD

RELATED APPLICATION DATA

This application is a division of U.S. application Ser. No. 08/871,378 filed Jun. 9, 1997, now U.S. Pat. No. 6,110,610. The foregoing application is incorporated herein by reference to the extent not already presented herein.

BACKGROUND OF THE INVENTION

1. Field of the Invention

The present invention relates to a film forming method for forming a diamond-like carbon film on an object, such as the above-mentioned magneto-optical recording medium, by RF plasma CVD.

2. Description of the Related Art

Up to now, a light modulation system or a magnetic field modulation system has been used as a recording system for the magneto-optical recording medium. With the magnetic field modulation system, an objective lens 49 for laser light radiation and a magnetic head modulation head 48 are arranged floating over a magneto-optical disc 50, as shown in FIG. 1.

With the magnetic field modulation system, the current allowed to flow through the magnetic head modulation head 48 is varied, at the same time as the laser light beam is continuously illuminated on the disc, for varying the magnetic field for overwriting new signals irrespective of the direction of magnetization of the recorded signals.

Referring to FIG. 2, the magneto-optical disc 50 has, as a recording layer 56, a dielectric film 52, a magnetic film 53, a dielectric film 54 and a reflective film 55, layered in this order on a polycarbonate substrate 51. On the reflective layer 55 is further layered a photocurable resin 57, such as UV curable resin, for preventing corrosion of the recording layer 56.

Although the magnetic field modulation head 48 and the magneto-optical disc 50 are out of contact with each other, they are proximate to each other, so that some external force occasionally gives rise to physical contact between the magnetic field modulation head 48 and the magneto-optical disc 50. There are also occasions wherein the foreign matter is intruded into a space between the magnetic field modulation head 48 and the magneto-optical disc 50. In such case, the photocurable resin 57 directly transmits the impact caused by contact of the disc with the magnetic field modulation head 48 or by intrusion of foreign matter to the recording surface 56.

SUMMARY OF THE INVENTION

It is therefore an object of the present invention to provide a magneto-optical recording medium whereby the recording layer may be prevented from impact caused by, for example, contact of the disc with the magnetic field modulation head 48.

It is another object of the present invention to provide a magneto-optical recording medium whereby the diamond-like carbon film may be prevented from being peeled from the recording layer for protecting the recording layer for a prolonged time.

It is yet another object of the present invention whereby the diamond-like thin carbon film formed on the object surface may be prevented from being peeled for protecting the object surface for a prolonged time.

DESCRIPTION OF THE PREFERRED EMBODIMENTS

Figure 1:
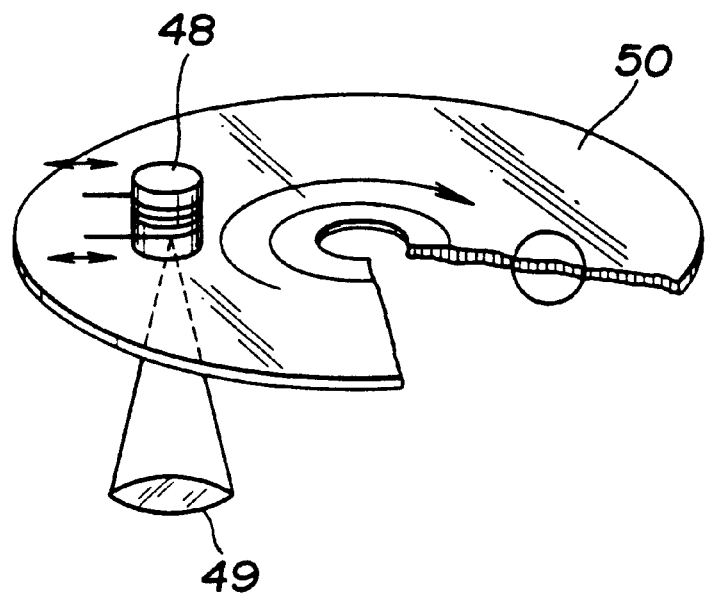
FIG. 1 is a perspective view showing a magneto-optical disc used for recording in accordance with the conventional magnetic field modulation system.
Figure 2:
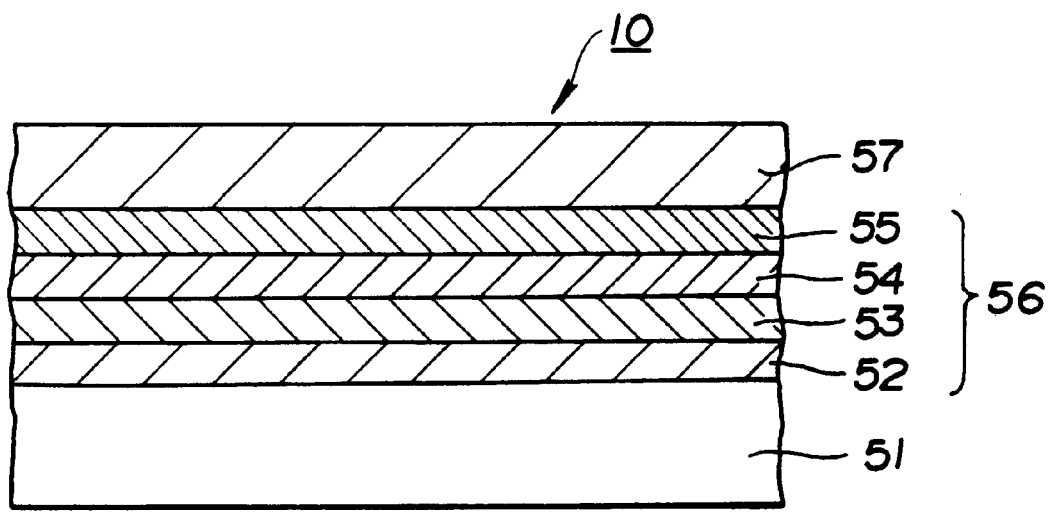
FIG. 2 is a cross-sectional view of the magneto-optical disc shown in FIG. 1.

Referring to the drawings, preferred embodiments of a magneto-optical disc and a method for forming a diamond-like carbon film on the magneto-optical disc according to the present invention will be explained in detail.

Figure 3:
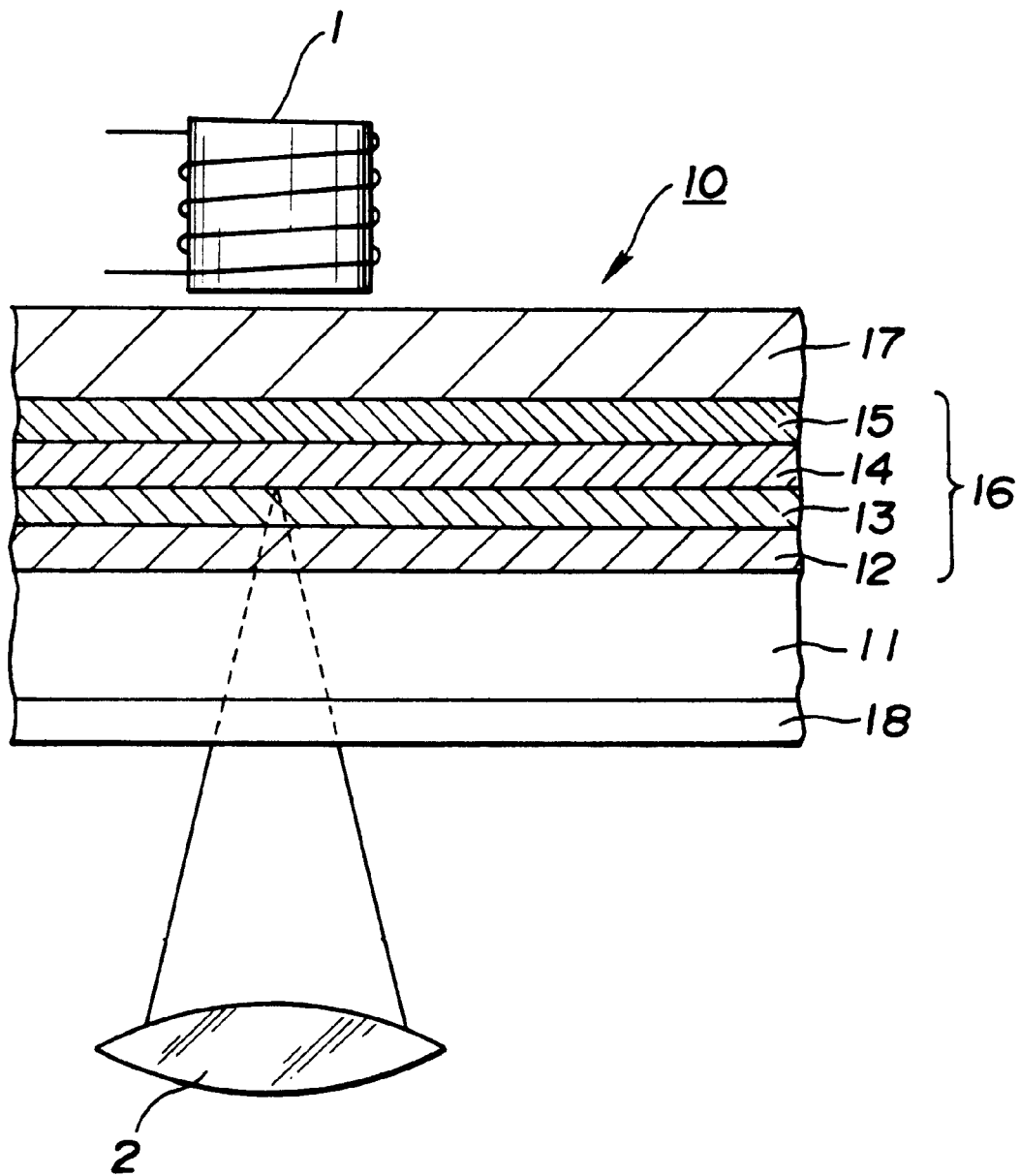
FIG. 3 is a cross-sectional view showing an embodiment of a magneto-optical disc embodying the present invention.

An embodiment of the present invention is explained first. This embodiment is directed to a magneto-optical disc overwritable by the magnetic field modulation shown in FIG. 3. On the surface of the recording layer 16 towards the magnetic field modulation head 1 is formed a diamond-like carbon (DLC) protective film 17. The direction of magnetization of the recording layer 16 formed on a polycarbonate substrate 11 adapted for transmitting the laser light from an optical head focused by the objective lens 2 therethrough is switched by a magnetic field modulation head 1 arranged floating on the surface of the recording layer 16 of the disc 10 opposite to its laser light incident side.

The thickness of the polycarbonate substrate 11 is 0.8 mm, as an example. The laser light incident side surface of the polycarbonate substrate 11 is coated with a UV light curable resin layer 18, as a photocurable resin, to a thickness of 10 to 18 $\mu$m.

The recording layer 16 has a thickness of, for example, 1950 Å. The recording layer 16 is made up of a dielectric film 12, such as a SiN film, to a thickness of 500 Å, a magnetic film 13, comprised of an amorphous alloy composed of a rare earth metal, such as terbium (Tb), and a transition metal, such as iron (Fe) or cobalt (Co), to a thickness of 250 Å, a dielectric film 14, such as an SiN film,. to a thickness of 500 Å and a reflective film 15, such as an aluminum (Al) film, to a thickness of 700 Å, layered together, looking from the side of the polycarbonate.

In this magneto-optical disc 10, the recording layer 16 is sequentially formed on the polycarbonate substrate 11 by the sputtering method.

The DLC protective film 17 is formed by plasma chemical vapor deposition (plasma CVD) in which a discharge voltage is impressed across a raw material gas under vacuum or reduced-pressure environment for inducing glow discharge for producing a plasma state of the raw material gas for activating the electron states for inducing chemical reactions such as decomposition and linkage on the surface of the reflective film 15 of the recording layer 16 thereby producing a thin film. As the raw material gas, hydrocarbons, such as benzene, methane, propane, ethylene, styrene or toluene are used.

It is assumed that the DLC protective film 17 is formed using methane. A target comprised of the polycarbonate substrate 11 and the recording layer 16 formed thereon is installed in a processing tank. Methane is then introduced at a pre-set flow rate by a gas inlet pipe. The high-frequency volt age at 13.56 MHz is impressed across RF electrodes at a power of 1 kW for 10 minutes for forming the 100 nm DLC protective film 17.

The DLC protective film 17 is a carbonaceous thin film having a diamond structure and has a high hardness and lubricating propprties. The thickness of the DLC protective film 17 is herein set to not less than 5 nm and to not more than 500 nm. If the thickness of the DLC protective film 17 is less than 5 nm, the DLC film is formed as an island and cannot cover the reflective film 15 in its entirety thus allowing the progress of corrosion. If the thickness of the DLC protective film 17 exceeds 500 nm, the DLC protective film 17 becomes excessive such that the film tends to be peeled off.

Thus, the DLC protective film 17 can suppress impact on the recording layer 16, even if the magnetic field modulation head 1 is contacted with the magneto-optical disc 10 under external impact, thus protecting the recording layer 16.

Figure 4:
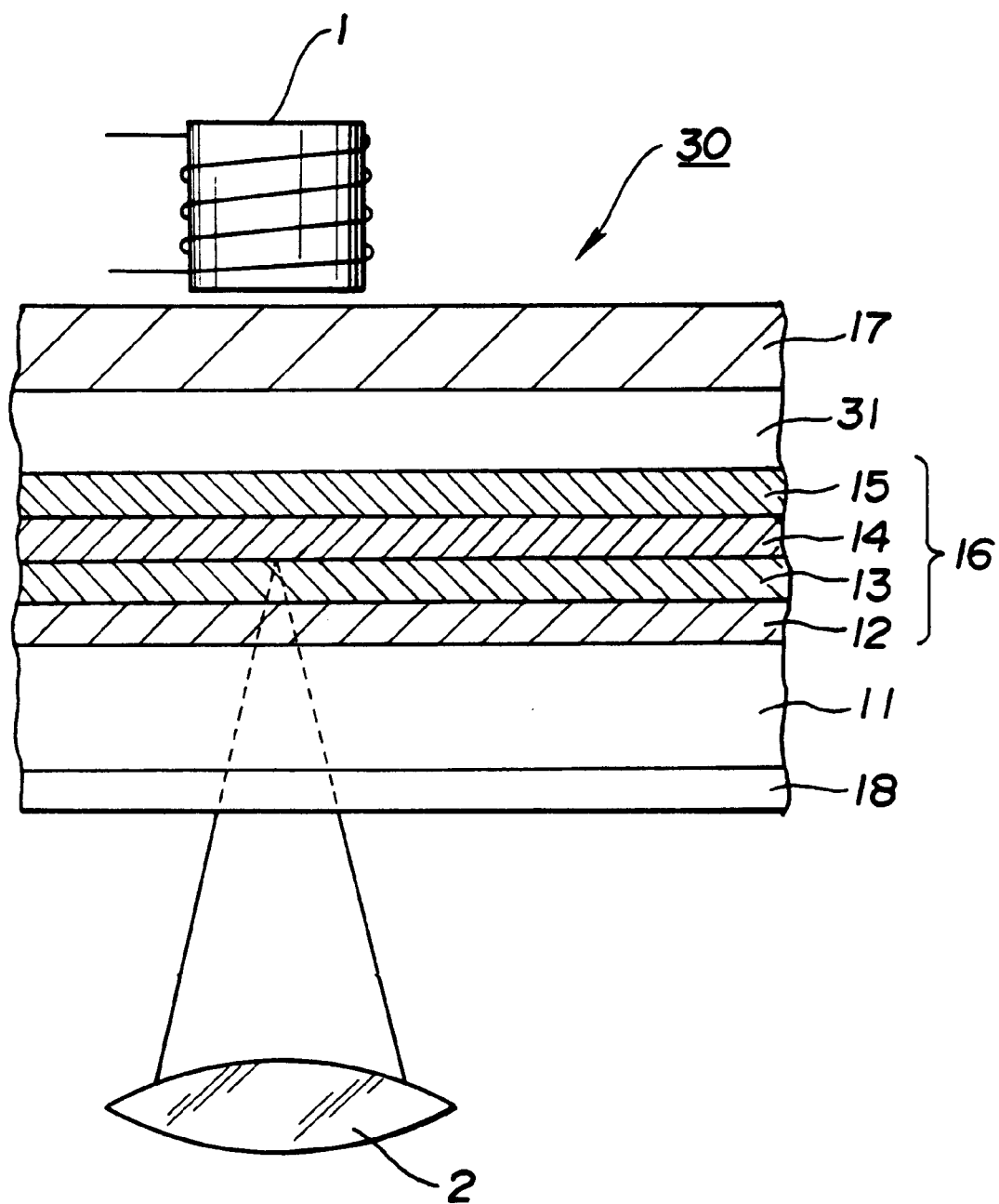
FIG. 4 is a cross-sectional view showing another embodiment of a magneto-optical disc embodying the present invention.

A modification of the present invention is explained by referring to FIG. 4. In the present embodiment, parts or components similar to those of the previous embodiment are denoted by the same reference numerals. In a magneto-optical disc 30 of the present embodiment, the DLC protective film 17 is formed on the surface of the recording layer 16 via a UV curable resin layer 31.

The UV curable resin layer 31 has a thickness of, for example, 1 μm and exhibits corrosion resistance prohibiting corrosion of the recording layer 16.

The DLC protective film 17 has a high hardness and high lubricating properties and can suppress impact on the recording layer 16. Moreover, since the UV curable resin layer 31 provided between the DLC protective film 17 and the recording layer 16 exhibits corrosion resistance, the magneto-optical disc 30 can protect the recording layer 16 from impact by contact with the magnetic field modulation head 1 and from corrosion.

Figure 5:
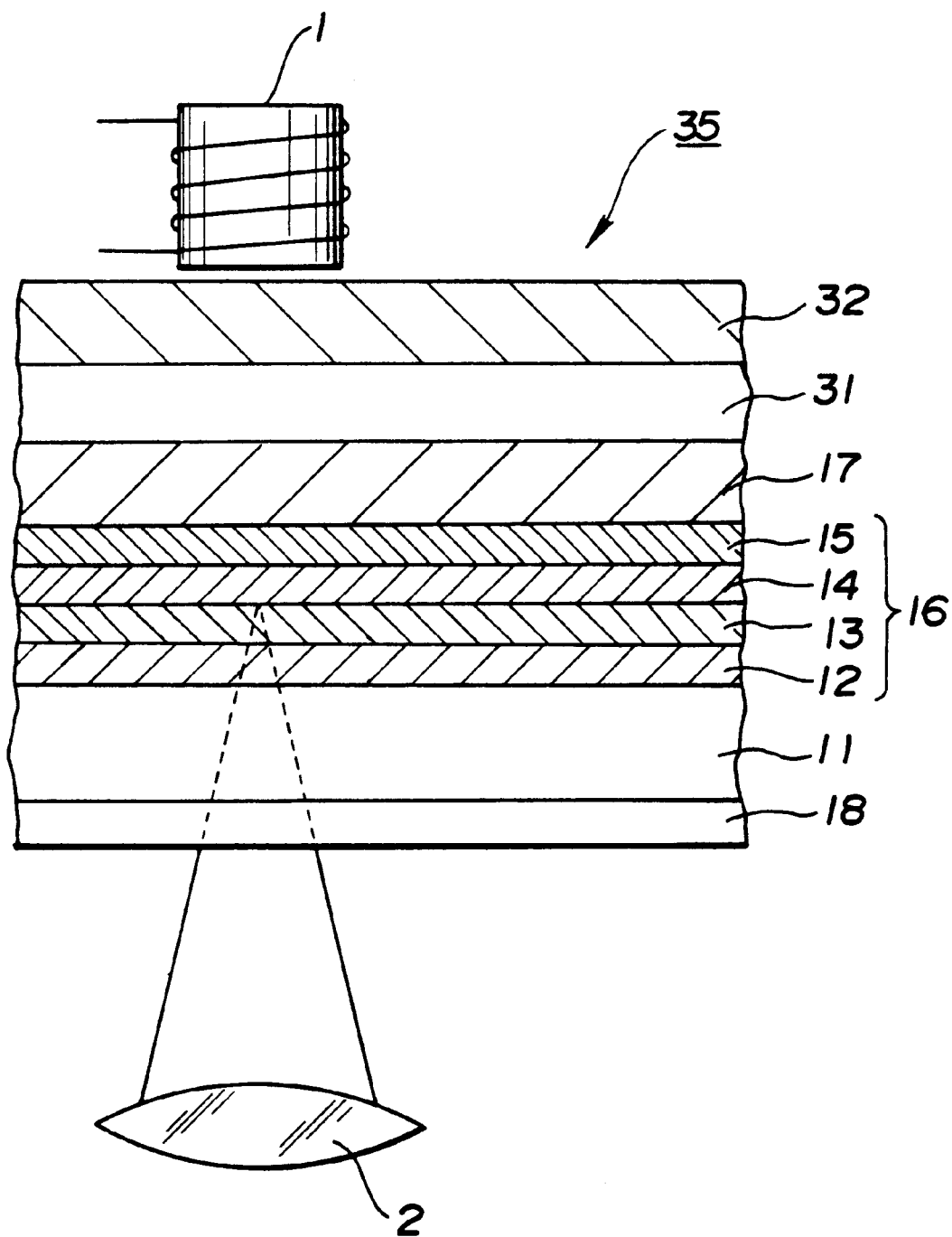
FIG. 5 is a cross-sectional view showing a further embodiment of a magneto-optical disc embodying the present invention.

A second modification of the present invention is explained by referring to FIG. 5. In the present embodiment, parts or components similar to those of the previous embodiment are denoted by the same reference numerals. In a magneto-optical disc 35 of the present embodiment, the UV curable resin layer 31 is formed on the recording layer 16, and a DLC protective film 32 is formed on the UV curable resin layer 31.

Thus the magneto-optical disc 35 can exhibit higher hardness, lubricating properties and corrosion resistance for strongly protecting the recording layer 15 from shock or corrosion.

Figure 6:
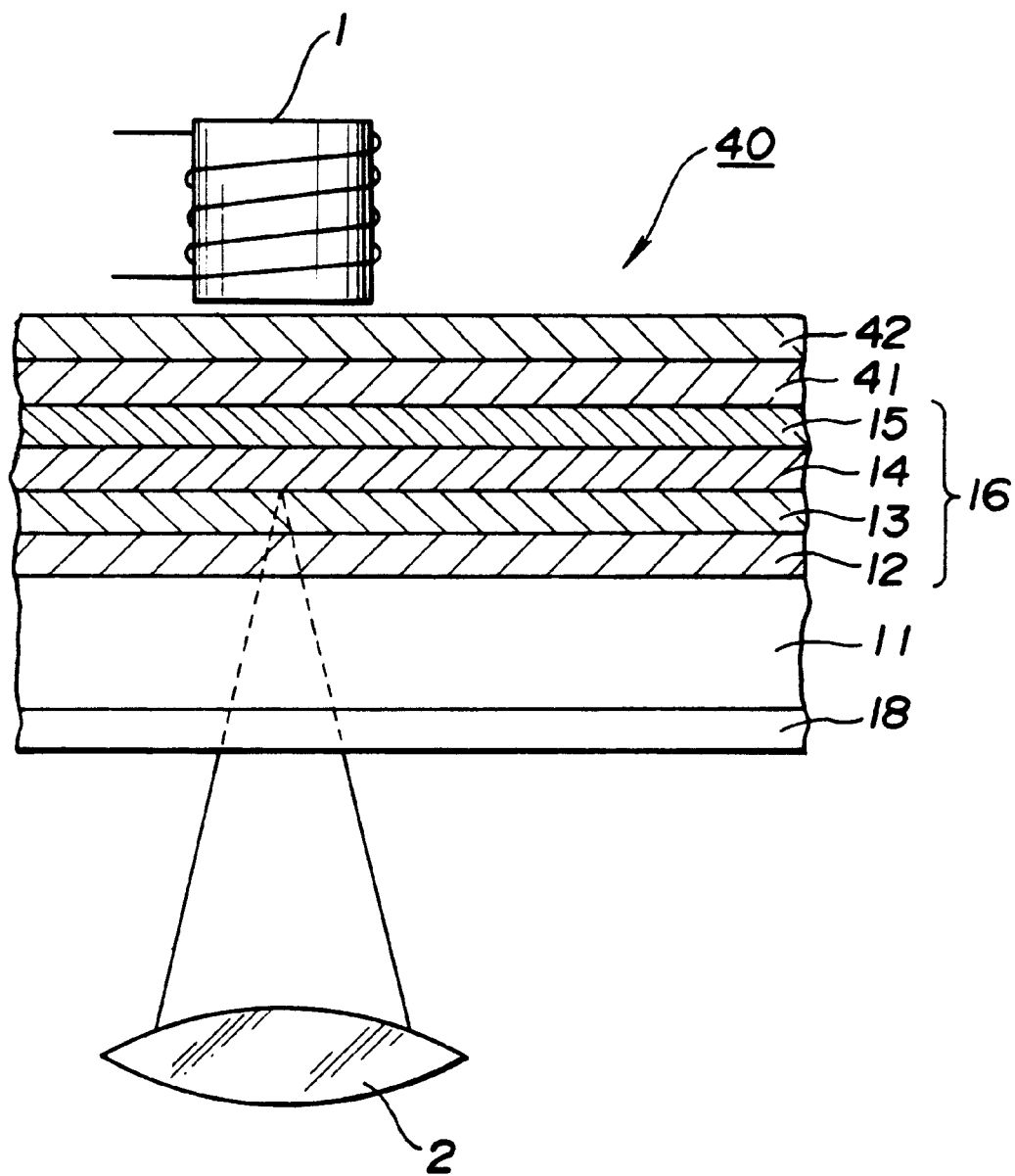
FIG. 6 is a cross-sectional view showing a further embodiment of a magneto-optical disc embodying the present invention.

A third modification of the present invention is explained by referring to FIG. 6. In the present embodiment, parts or components similar to those of the previous embodiment are denoted by the same reference numerals. In a magneto-optical disc 40 of the present embodiment, DLC protective films 41, 42 of different harnesses are layered on the recording layer 16. The DLC protective film 41, formed in contact with the reflective film 15 of the recording layer 16, is lower in hardness, that is softer, than the DLC protective film 42 formed towards the magnetic field modulation head. Meanwhile, the DLC protective film 42 represents the surface of the magneto-optical disc 40 towards the magnetic field modulation head.

In general, the DLC protective film is strong in residual stress and is liable to be peeled off in case the DLC protective film is formed on the reflective film 15 of aluminum (Al). Thus, in the present fourth embodiment, DLC protective films 41, 42 of different harnesses are layered on the recording layer 16 for preventing such peeling.

The DLC protective films 41, 42 of different harnesses may be formed by plasma CVD employing the DLC film forming device, shown in FIG. 7, as later explained.

Of course, the DLC protective films 41, 42 exhibit hardness and lubricating properties. Thus, in the magneto-optical disc 40 of the present fourth embodiment, the recording layer 16 is less likely to be peeled off from the recording layer 16 by the DLC protective film 42 thus stabilizing the recording layer 16 for protecting the disc against impact possible applied from the magnetic field modulation head 1.

In the present embodiment, two DLC films of different hardnesses, that is the DLC protective film 41 of low hardness and the DLC protective film 42 of high hardness, are used. However, a sole protective film having progressively increasing hardness may be used for forming a protective film for preventing peeling or protecting the recording layer 16 against impact.

Figure 8:
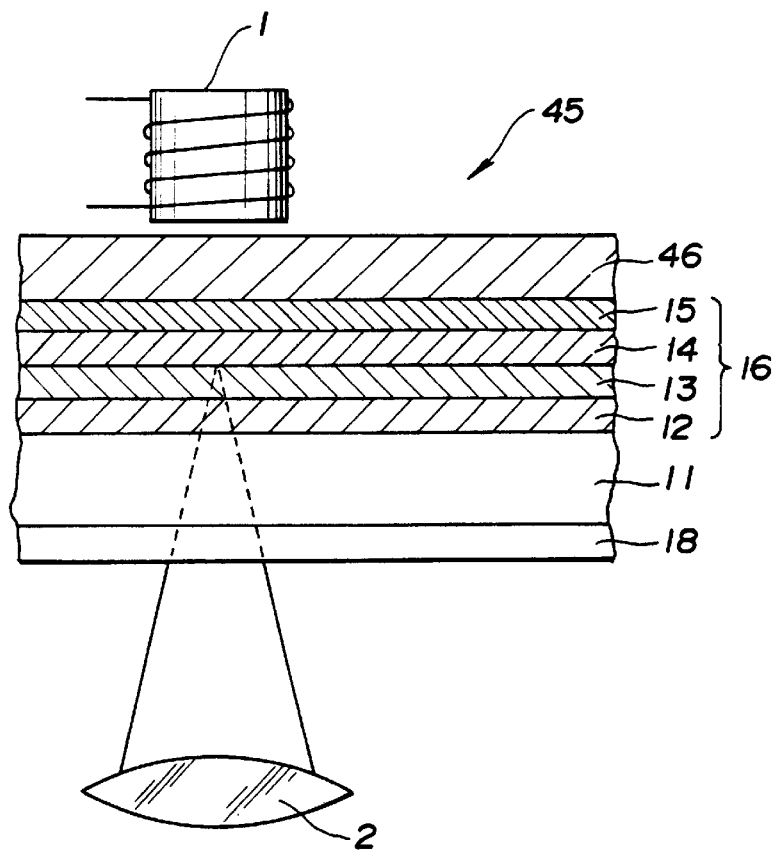
FIG. 8 is a cross-sectional view showing yet another embodiment of a magneto-optical disc embodying the present invention.

A fourth embodiment is explained by referring to FIG. 8. In a magneto-optical disc 45 of the present embodiment, a diamond-like carbon film 46 comprised of a mixed network of $SiO_2$ and hydrogenated carbon is formed on the surface of the recording layer 16. The mixing ratio of $SiO_2$ to hydrogenated carbon is 1:1 to 1:10 by weight.

The DLC protective film, comprised of the mixed network film 46, is also effective to improve residual stress of the protective layer for the reflective film 15 of the recording layer 16.

The mixed network film 46 may be generated by decomposing a silane gas and a methane gas and mixing $SiO_2$ and hydrogenated carbon in an oxygen atmosphere.

The DLC protective film of the above embodiment may be generated by plasma CVD having an RF power source, that is a so-called RF plasma CVD.

Figure 7:
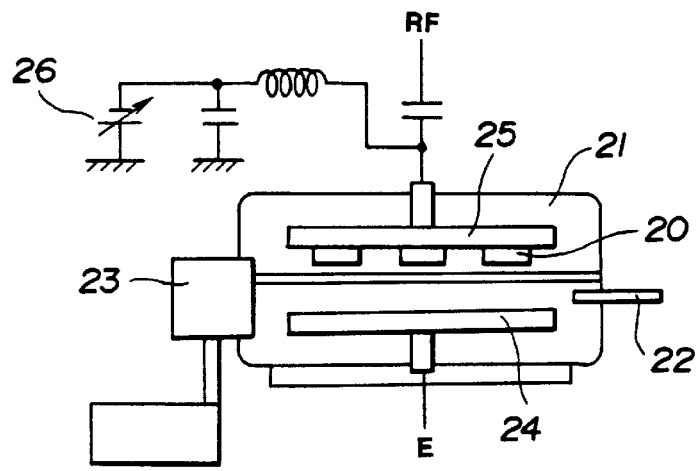
FIG. 7 is a front view showing a DLC film-forming device for forming a DLC film according to the present invention.

Referring to FIG. 7, formation of the DLC protective film on a semi-finished magneto-optical disc, referred to hereinafter as a test sample, in which up to the recording layer has been finished using, for example, a methane gas as a raw material gas, is explained.

Plural test samples 20 are placed on the side of an anode 25 in a processing layer 21 and a methane gas is caused to flow via a gas inlet conduit 22 into the processing layer 21. The processing layer 21 is evacuated by a molecular turbo-pump 23. The high-frequency voltage of 13.56 MHz shown by RF in FIG. 7 is then impressed for ionizing the carbon. The resulting ions are vibrated between a cathode 24 and the anode 25. Since the electrons and ions differ in mass, the ions are accumulated towards the anode 25 for generating a self-bias voltage. This self-bias voltage or a DC bias voltage added by circuit technique which is variable by a variable power source 26 is varied for maintaining an ion energy optimum for generating the DLC protective film, that is a voltage not higher than 200 eV.

In general, a thin film can be generated by setting the ion energy so as to be 10 eV or higher. The upper limit voltage, for which film formation becomes impossible due to simultaneous progress of film formation and sputtering by self-sputtering is 200 eV. Thus the voltage range for film formation is 10 to 200 eV.

The film-forming energy is closely related with the vacuum in the processing layer and the with the RF power. For setting the thin film energy in a range of from 10 to 200 eV, the vacuum is set to 1 to 90 Pa, while the RF power is set to 10 to 2000 W and the self-bias voltage is varied in a range of −10 to −500V. This generates a DLC film.

It is assumed that two DLC films shown in FIG. 6 are formed by a film forming device shown in FIG. 7.

By impressing the RF power of, for example, 500 W, in FIG. 7, a DLC protective film with a Vickers hardness of, for example, 800 kg/mm$^2$, can be formed on the recording layer of the magneto-optical-disc arranged towards the anode 25 by an energy of −50 eV with a self-bias of −50V.

By setting the RF power on the DLC protective film to, for example, 1500 W, a DLC protective film with a Vickers hardness of, for example, 1500 kg/mm$^2$ with an energy of 200 eV with a self-bias of −200 V. This completes two DLC films having different thicknesses.

This completes a magneto-optical disc, comprised of a DLC protective layer 41, with a Vickers hardness of, for example, 800 kg/mm$^2$ and a DLC protective layer 42, with a Vickers hardness of, for example, 1500 kg/mm$^2$, layered on a recording layer 16, made up of a dielectric layer 12, a magnetic film 13, a dielectric film 14 and a reflective film 15, layered in this order on the polycarbonate substrate 1, as shown in FIG. 6.

By layering the soft DLC protective film 41 and the hard DLC protective film 42 on the recording layer 16, film peeling may be prevented from being produced, and hence the protective film, layered as described above, can operate effectively for prolonged time. This provides a magneto-optical disc the recording layer of which can be protected for prolonged time.

The above-described film-forming device can be adapted for a variety of object surfaces without being limited to a magneto-optical disc having the soft DLC protective film 41 and the hard DLC protective film 42 layered on the recording layer 16. For example, the film-forming device can be adapted for a reading surface of a magnetic disc, magnetic tape and to a magnetic recording/reproducing drum.

If the RF power of the above embodiment is continuously varied during film formation from 500 W to 1500 W, as an example, the DLC protective film, the film hardness of which is continuously changed towards the recording surface, can be formed and layered on the recording layer 6, as shown in FIG. 5.

By forming the DLC protective film having continuously different hardness on the recording layer 6, film peeling can be prevented from occurring. The thin film, thus formed, may be in operation effectively for prolonged time as a protective film. This furnishes a magneto-optical disc the recording layer of which can be protected for prolonged time.

Since the magneto-optical disc according to the present invention has a protective layer of diamond-like carbon on the side of the magnetic field modulating head overlying the recording layer, the latter can be protected from impact caused by contact with the magnetic field modulating head.

Also, with the magneto-optical disc according to the present invention, since the protective layer is layered on the photocurable layer formed on the recording layer, the latter can be protected not only from impact caused by contact with the magnetic field modulating head but also from corrosion.

Moreover, with the magneto-optical disc according to the present invention, since the protective layer is formed by a mixed film containing the diamond-like carbon, the recording layer can be protected from impact caused by contact with the magnetic field modulating head, while the recording layer is prohibited from being peeled off from the recoding layer.

What is claimed is:

1. A method for forming a magneto-optical recording medium, comprising the steps of:
    forming a magnetic film on a substrate;
    forming a light-reflective film on said magnetic film;
    forming a first diamond-like carbon film of a first hardness on said light reflective film; and
    forming a second diamond-like carbon film of a second hardness higher than said first hardness on said first diamond-like carbon film.

2. The method as claimed in claim 1, wherein:
    said step of forming a first diamond-like carbon film further comprises the steps of:
    utilizing RF plasma CVD, and
    varying the RF power during said step of forming said first diamond-like carbon film, producing a varying film hardness in a direction towards a recording surface; and
    said step of forming a second diamond-like carbon film further comprises the steps of:
    utilizing RF plasma CVD, and
    varying the RF power during said step of forming said second diamond-like carbon film, producing a varying film hardness in a direction towards a recording surface.

3. The method as claimed in claim 1, further comprising the steps of:
    forming a transparent substrate;
    forming a recording layer towards one surface of said transparent substrate;
    inputting laser light from a recording device to said one surface of said transparent substrate while applying a modulation magnetic field by a magnetic field head from the other surface of said transparent substrate, wherein said modulation magnetic field is applied at an upper surface of said magneto-optical recording medium that is closer to said magnetic field head than said recording layer.

4. A method for forming a magneto-optical recording medium, comprising the steps of:
    forming a magnetic film on a substrate;
    forming a light-reflective film on said magnetic film;
    forming a first protective film of a first hardness on said light reflective film; and
    forming a second protective film of a second hardness higher than said first hardness on said first diamond-like carbon film.

5. The method as claimed in claim 4, wherein:

said step of forming a first protective film further comprises the steps of:
   utilizing RF plasma CVD, and
   varying the RF power during said step of forming said first protective film, producing a varying film hardness in a direction towards a recording surface; and said step of forming a second protective film further comprises the steps of:
   utilizing RF plasma CVD, and
   varying the RF power during said step of forming said second protective film, producing a varying film hardness in a direction towards a recording surface.

6. The method as claimed in claim 4, further comprising the steps of:
   forming a transparent substrate;
   forming a recording layer towards one surface of said transparent substrate;
   inputting laser light from a recording device to said one surface of said transparent substrate while applying a modulation magnetic field by a magnetic field head from the other surface of said transparent substrate, wherein said modulation magnetic field is applied at an upper surface of said magneto-optical recording medium that is closer to said magnetic field head than said recording layer.

* * * * *